Aug. 21, 1956  L. A. CARLSON ET AL  2,759,571
BRAKE CONTROL APPARATUS
Filed March 31, 1953
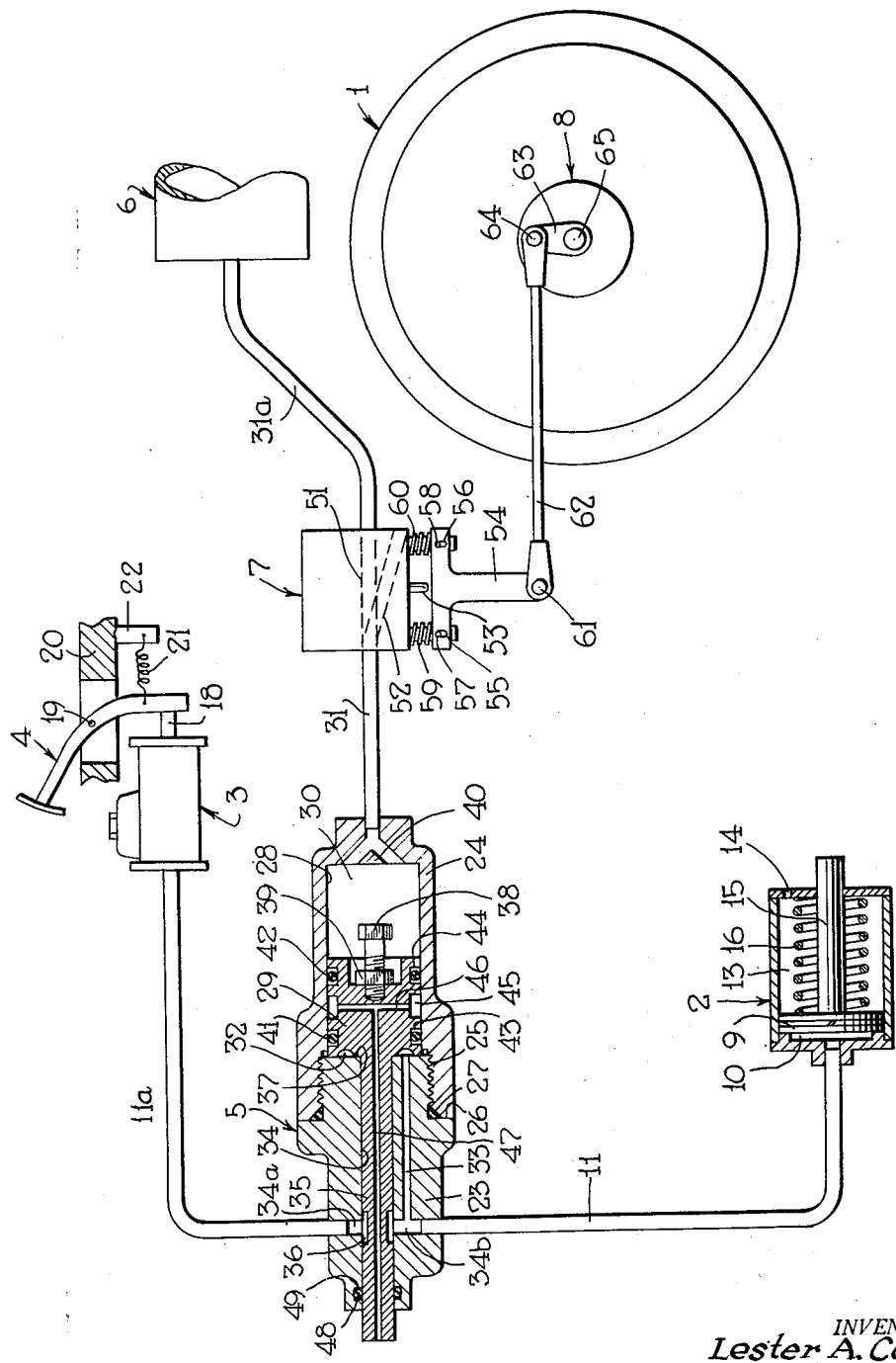
INVENTORS
Lester A. Carlson
BY Robert H. Carlson
Adelbert A. Steinmiller
ATTORNEY

United States Patent Office 2,759,571
Patented Aug. 21, 1956

2,759,571
BRAKE CONTROL APPARATUS

Lester A. Carlson, Pittsburgh, Pa., and Robert H. Carlson, Hempstead, N. Y., assignors to Westinghouse Air Brake Company, Wilmerding, Pa., a corporation of Pennsylvania Application March 31, 1953, Serial No. 345,794

4 Claims. (Cl. 188—181)

This invention relates to brake control apparatus for vehicles and, more particularly, to the type for automatically preventing sliding of wheels on a vehicle, such as a highway vehicle or an airplane, due to untimely brake applications effected by physical operation of a hydraulic pressure type of brake apparatus.

With respect to airplanes today they generally land at relatively high speeds. As a result, the landing wheels of an airplane are accelerated from a non-rotative position to a very high speed, corresponding to ground speed, when the airplane lands. In some cases the landing of the airplane may not be precise enough, so that the airplane may bounce several times before it settles firmly on the runway. In other cases the runway itself may be uneven or its condition may vary as a result of icy or wet conditions so as to cause accelerating forces acting on the landing wheels to vary as the airplane travels along said runway. In all such cases it is difficult, in the absence of any automatic control of the brakes on the wheels, for the pilot or operator to so control said brakes as to avoid sliding of the wheels, causing undesirable wear on the tires or, in some instances, damage to the vehicle itself.

In order to eliminate such undesirable wear of tires or hazards of accidents, wheel slip responsive means have been devised, in the form of inertia operable control devices, whereby application and release of the brakes on wheels are controlled automatically to prevent sliding of said wheels. Such a device is disclosed, for example, in U. S. Patent No. 2,573,387, issued to Rankin J. Bush on October 30, 1951. The device disclosed therein, however, is designed for use chiefly with brake systems employing pneumatic fluid under pressure, and in operation, in response to slipping of a wheel or wheels, releases fluid under pressure from the brake applying brake cylinder device to atmosphere in order that slipping of the wheel will cease and permit said wheel to accelerate back to ground speed, whereupon fluid under pressure will again be supplied to said brake cylinder device to reapply the brakes, and such release and reapplication of brakes is automatically repeated to avoid sliding of the wheels and thus maintain control of the vehicle during deceleration.

Some airplanes and other vehicles, on the other hand, are equipped with hydraulic pressure operable brake systems, in which case also it would be desirable to provide some means whereby brake application and release could be automatically controlled. An inertia operable control device, such as disclosed in the aforementioned patent, when used with hydraulic pressure operable brake apparatus, would, however, present certain undesirable conditions.

One of these conditions would be possible depletion of the hydraulic fluid in the master brake cylinder device of the brake apparatus. To effect a brake application, the pilot or operator would apply pressure on a foot pedal, and in response to a slipping condition of the wheel, the inertia control device would automatically take over control of the application and release of the brakes to prevent the wheel from becoming locked and sliding. If the hydraulic fluid from the wheel brake cylinder device were released to atmosphere, as in pneumatic brake systems, the supply of such fluid would gradually become depleted in the master brake cylinder device. Such depletion of the hydraulic fluid in the master brake cylinder device could eventually result in the foot pedal coming in contact with the floor boards. At that point the pilot or operator would have to pump his brake foot pedal back and forth to restore the hydraulic fluid in the master brake cylinder device during which time the brakes could conceivably be ineffective.

One object of the invention is the provision of an improved manually operable hydraulic brake apparatus embodying automatic means adapted to respond to slipping of a vehicle wheel for taking over control of a brake application so as to prevent the wheel from becoming locked and sliding.

Another object of the invention is the provision of such an apparatus in which the supply or amount of hydraulic fluid in the master brake cylinder device and the brake applying position of the operator's foot pedal are not influenced by operation of the automatic means.

Another object of the invention is the provision of a hydraulic brake apparatus in which hydraulic fluid is displaced from a master brake cylinder device, by manual operation of a foot pedal, to a wheel brake cylinder device for applying the brakes to a wheel, said apparatus embodying means automatically responsive to slipping of said wheel to close communication between said master brake cylinder device and said wheel brake cylinder device and release hydraulic fluid from said wheel brake cylinder device to release the brakes on said wheel and operative upon cessation of slipping of said wheel to displace such released fluid back into said wheel brake cylinder device to reapply the brakes and to also reopen said communication, whereby operation of said means will not affect the amount of hydraulic fluid in said master brake cylinder device or the operation or position of said foot pedal.

Other and more detailed objects of the invention will appear in the following more detailed description thereof when read in conjunction with the accompanying drawing.

In the accompanying drawing, the single figure is a diagrammatic view, partly in section and partly in outline, of a hydraulic pressure operable brake control apparatus embodying the invention.

Description

As shown in the drawing, the reference numeral 1 designates a wheel to be braked. The wheel 1 may be that of an airplane or any other vehicle employing a hydraulic brake apparatus for braking said wheel. The invention will hereinafter be described in connection with an airplane, but it is to be understood that it is not so limited for it is equally applicable to other wheel vehicles.

The hydraulic brake apparatus for wheel 1 may be of conventional type comprising a hydraulic wheel brake cylinder device 2, a hydraulic master brake cylinder device 3 and a foot pedal 4. According to the invention there is added to the brake apparatus a displacement piston valve device 5, a source of pneumatic fluid under pressure, such as a reservoir 6, a release valve device 7 and a wheel slip responsive rotary inertia type control device 8.

The wheel brake cylinder device 2 is adapted to be arranged in conventional manner for applying brakes (not shown) to the wheel 1 and, for the purpose of illustration, comprises a casing containing a piston 9 at one side of which there is a pressure chamber 10 adapted to be connected through a conduit comprising pipes 11, 11a to the master brake cylinder device 3 and at the opposite side a non-pressure chamber 13 vented to atmosphere through a port 14 in said casing. The piston 9 has concentrically associated therewith in chamber 13 a piston rod 15 extending beyond the limits of the casing and adapted for controlling the brakes of wheel 1 by suitable means (not shown). Upon pressurization of hydraulic fluid contained in the master brake cylinder device 3, in pipes 11a, 11 and thereby in pressure chamber 10, by means which will hereinafter be described, the piston 9 and the piston rod 15 are adapted to be moved in the direction of the right hand, as viewed in the drawing, to a brake applying position in which the brakes on wheel 1 are applied. Upon removal of pressure on the hydraulic fluid in the master brake cylinder device 3 and thereby in pipes 11a, 11 and pressure chamber 10, a spring 16 may be provided in chamber 13 to act on piston 9 to move said piston and the piston rod 15 back to a normal position, in which they are shown in the drawing and in which the brakes on wheel 1 are released.

The master brake cylinder device 3, which is shown in outline, may be of the usual type containing a piston (not shown) and hydraulic fluid adapted to be pressurized by said piston. A piston rod 18 associated with the piston of the master brake cylinder device 3 projects beyond the casing limits of said cylinder device to make abutting engagement with one end of the foot pedal 4.

The foot pedal 4 is pivotally mounted intermediate its ends by means of a pin 19 secured to a portion of the airplane body 20 and is adapted to be manually operated for moving the piston rod 18 and the piston of the master brake cylinder device 3 toward a left hand position, as viewed in the drawing, in which the hydraulic fluid contained in said cylinder device is pressurized. A spring 21, attached at one end to a bracket 22 associated with body portion 20 and at the other end to the foot pedal 4, may be adapted for biasing said foot pedal to a normal position, in which it is shown in the drawing, upon removal of manual pressure on said foot pedal, thereby permitting piston rod 18 and the piston of the master brake cylinder device 3 to be returned (by suitable means not shown) back to a normal position in which pressure on the hydraulic fluid contained in said cylinder device is removed.

According to the invention, the piston valve device 5 is interposed between pipes 11, 11a for controlling communication therebetween and thereby between the brake cylinder device 2 and the master brake cylinder device 3, it being noted that pipe 11 connects device 5 to the brake cylinder device 2, while pipe 11a connects device 5 to the master brake cylinder device 3.

The device 5 comprises a casing made in two sections 23 and 24 assembled to each other by means of screw-threads 25, with section 24 abutting a shoulder 26 formed on section 23. A sealing ring 27 is annularly disposed at the joint between casing sections 23 and 24 to prevent leakage of fluid under pressure through said joint.

The casing section 24 has a bore 28 in which a piston 29 is disposed to reciprocate. At one side of piston 29 there is a pneumatic pressure chamber 30 connected by pipes 31, 31a to the reservoir 6. At the opposite side of piston 30 there is a hydraulic displacement chamber 32 which is open through a passageway 33 in casing section 23 to pipe 11 and thereby pressure chamber 10 in the wheel brake cylinder device 2. Projecting from one face of piston 29 through the displacement chamber 32 and a bore 34 in casing section 23 to the exterior thereof is a piston stem constituting a valve 35 having sliding contact with the wall of said bore. The bore 34 is open through passages 34a and 34b, arranged diametrically opposite each other, for the purpose of illustration, to pipes 11a and 11, respectively, the stem 35 being provided with an annular recess 36 adapted to establish communication between said passages and thereby said pipes when the piston 29 and the stem 35 occupy a normal position, in which they are shown in the drawing and which is defined by contact of said piston with a shoulder 37 formed on casing section 23. The piston 29 and stem 35 are movable from this normal position to a brake release position, defined by engagement of a stop 38, in the form of a bolt adjustably connected by screw-threads to said piston and secured in an adjusted position by a lock nut 39, with end-wall 40 of chamber 30. With piston 29 and stem 35 in the brake release position, the recess 36 is adapted to be out of registry with pipes 11, 11a, so as to close communication between said pipes, and the volume of chamber 32 is increased over that in the application position of said piston for reasons which will hereinafter be described.

The piston 29 is provided with two, axially spaced apart, sealing rings 41 and 42 disposed in annular recesses 43 and 44, respectively, open to the peripheral surface of said piston; said rings having sealing and sliding contact with the wall of bore 28 to minimize leakage of fluid pressure from chambers 30 and 32 to an annular groove 45 formed in said piston and open to the peripheral surface thereof between said rings. The groove 45 is open to atmosphere by way of a passageway 46 in piston 29, said passageway having both ends opening into said groove and connected to a passageway 47 in the stem 35 leading to the exterior end thereof. A sealing ring 48 disposed in an annular recess 49 in the casing section 23 has sealing and sliding contact with valve stem 35 to prevent leakage of hydraulic fluid past said valve stem to atmosphere.

The reservoir 6, constituting a source of pneumatic fluid under pressure, may be charged, prior to operation of a vehicle, with air at sufficient pressure which, acting in chamber 30, will hold piston 29 and piston stem 35 in their normal position against opposing brake applying pressure of hydraulic fluid in chamber 32, during a trip or operation of the vehicle.

The release valve device 7, which is shown in outline in the drawing, is interposed between pipes 31 and 31a for controlling communication therebetween and between pipe 31 and atmosphere, and may be, for example, like that disclosed in the aforementioned patent issued to Rankin J. Bush.

Briefly, the device 7 comprises valve means (not shown) having a normal position in which communication between pipes 31, 31a is open by way of a communication indicated, schematically, by dash lines 51, and a pneumatic fluid pressure release position in which communication between said pipe is closed and pipe 31 and thereby chamber 30 in device 5 are open to atmosphere by way of a communication indicated, schematically, by dash lines 52.

The release valve device 7 also comprises a pilot valve (not shown) mechanically operable for rendering either one or the other of communications 51 or 52, above described, effective. This pilot valve has a stem 53 projecting therefrom through the casing and to the exterior of said casing, said valve stem being arranged to have its projecting end engaged by a T-shaped operating lever 54 at the junction of two oppositely extending arms. The two arms of lever 54 have near their ends slots 55 and 56 through which pins 57 and 58, secured to the casing, extend, respectively. Two like springs 59 and 60 under pressure are interposed between the casing of the device and the opposite ends of the two arms, respectively, of operating lever 54 to bias said lever to a central, normal position in which said lever disengages the end of valve stem 53 to render communication 51 effective and to close communication 52, said operating lever being pivotable about each of the pins 55 or 56 so as to engage and move the valve stem 53 into the device 7 to close communication 51 and open communication 52. A portion of operating lever 54 depends from the junction of the two oppositely extending arms and is pivotally connected at its lower end by means of a pin 61 to one end of a link rod 62, the other end of said link rod being pivotally connected to one end of a rocker arm 63 by means of a pin 64. The other end of rocker arm 63 is rigidly attached to an operating shaft 65 of the inertia operable control device 8.

The inertia operable device 8, which is shown in outline in the drawing, may be of any suitable type, but preferably is a rotary type, such as that disclosed, for example, in the aforementioned patent issued to Rankin J. Bush, including a housing adapted to be coaxially and fixedly mounted on the wheel 1. While not shown in the drawing and not deemed essential to an understanding of the invention, the housing of the inertia device 8 contains a relatively rotatable rotary inertia mass connected through clutch means and a cluster of planetary gears to the operating shaft 65, so that, when rotation of said inertia mass is in synchronization with the rotation of the landing wheel 1 or what may be called a normal rotating position occupied when said wheel is not slipping on the runway, no rotative effect is produced on said operating shaft, and the release valve device 7 will occupy its normal position, but when, as applied to an airplane, said wheel is accelerating to ground speed immediately following touchdown or when said wheel is decelerating in response to slip on the runway, said inertia mass will either lag behind or overrun, respectively, said wheel and operate said shaft to in turn operate the release valve device 7 to its release position.

While, for purposes of illustration, only one landing wheel assemblage is shown in the drawing, it should be understood that each landing wheel of an airplane or other vehicle is intended to be similarly provided with a brake control apparatus embodying the invention and to be controlled in the manner now to be described for the one landing wheel shown in the drawing.

*Operation*

In operation, let it be assumed that reservoir 6 is charged with pneumatic fluid under pressure; that the several devices comprising the brake control apparatus are in their respective normal positions, in which they are shown in the drawing, and that chamber 30 of the piston valve device 5 is charged with pneumatic fluid under pressure by way of pipe 31a, which is open through communication 51 in device 7 to pipe 31. Also assume that the master brake cylinder device 3, pipes 11a and 11 and chambers 32 and 10 of the piston valve device 5 and the wheel brake cylinder device 2, respectively, contain hydraulic fluid.

Let it also be assumed that the landing wheels of the airplane, in landing, have just made contact with the surface of the runway. The pilot of the airplane, immediately upon touchdown of wheel 1 on the runway surface, or shortly thereafter, will apply foot pressure to the foot pedal 4 which will pivot about pin 19 in a clockwise direction, as viewed in the drawing, to exert a force upon the piston rod 18 of the master brake cylinder device 3 and the piston (not shown) contained therein. This piston in turn will exert pressure upon the hydraulic fluid contained in the master brake cylinder device 3 and the pipes 11a and 11 and thus pressurize the fluid in chamber 32 and chamber 10 of the piston valve device 5 and the wheel brake cylinder device 2, respectively.

Immediately upon touchdown of wheel 1, said wheel will start to accelerate and overrun the rotary inertia mass contained in the inertia control device 8 and thereby effect an angular movement of the operating shaft 65 and the rocker arm 63 out of normal position in a clockwise direction, as viewed in the drawing. This movement of arm 63, acting through link 62, will rock lever 54 of the release valve device 7 about the pin 57 in a counter-clockwise direction, as viewed in the drawing, against the opposing force of spring 60. This rocking of lever 54 will actuate the stem 53 and the pilot valve contained in the release valve device 7 to render communication 51 ineffective and communication 52 effective, thereby releasing the pneumatic fluid pressure in chamber 30 of the piston valve device 5 to atmosphere by way of pipe 31 and communication 52.

The inertia device 8 will respond to acceleration of the wheel 1 to open chamber 30 in the device 5 to atmosphere, as just described, almost instantaneously at the start of acceleration of wheel 1 upon touchdown. As soon as a slight hydraulic pressure, incident to the above described depression of lever 4, is obtained in chamber 32, whether slightly prior to the venting of chamber 30, coincidental therewith or after such venting has been effected, such pressure, with chamber 30 vented, will move the piston 29 and valve 35 to their release position closing communication between pipes 11a and 11 and enlarging chamber 32 to receive hydraulic fluid from the brake cylinder chamber 10 and thereby relieve the brake cylinder piston 17 of any hydraulic pressure which may have been acting thereon. It is desired to point out, however, that if the brake pedal 4 is not prematurely operated, the piston 29 will move the valve 35 to its release position as above described before sufficient hydraulic pressure can be obtained in the brake cylinder pressure chamber 10 to apply the brakes on wheel 1. In the manner just described, an application of brakes to the wheel 1 will be automatically prevented upon touchdown of said wheel.

When, after touchdown, the wheel 1 has become accelerated to substantially ground speed, the inertia mass in the inertia device 8 will obtain a corresponding speed and permit spring 60 to return lever 54 to its normal position out of contact with valve stem 53, thereby permitting the pilot valve contained in the release valve device 7 to operate to disestablish communication 52 and reestablish communication 51. With communication 51 reestablished, chamber 30 of the piston valve device 5 will again be charged with pneumatic fluid pressure from reservoir 6, as above described. The pneumatic fluid pressure thus provided from reservoir 6 in chamber 30 acting on piston 29 produces a force exceeding that provided by the pressure of hydraulic fluid in chamber 32, even upon maximum brake applying movement of lever 4, whereby the piston 29 and piston stem 35 will be promptly moved back toward their normal positions, and in so doing said piston will force the hydraulic fluid in chamber 32 back through passageway 33 and pipe 11 into chamber 10 of the wheel brake cylinder device 2. With valve stem 35 once again in its normal position, recess 36 will connect pipes 11a and 11 so that hydraulic fluid at desired braking pressure, determined by the pilot's pressure on lever 4, will be transmitted to chamber 10 of the wheel brake cylinder device 2 for actuating piston 9 therein, against opposing force of spring 16, to effect braking of wheel 1.

Let it be assumed now that, with the brakes applied to wheel 1, said wheel runs into an uneven or slippery condition on the runway where the traction is insufficient to keep said wheel rolling against the retarding action of the brakes applied to said wheel. As a result, the wheel will begin to slip and decelerate relative to the rotary inertia mass in the inertia control device 8 whereby the shaft 65 and rocker arm 63 will be rocked in a counterclockwise direction and turn lever 54 from normal position about the pin 58 in a clockwise direction, as viewed in the drawing, against the opposing force of spring 59 and thereby operate the pilot valve contained in the release valve device 7 to disestablish communication 51 and establish communication 52, whereby pneumatic fluid pressure in chamber 30 of the piston valve device 5 will be released, as heretofore described.

In the manner hereinbefore described, the piston valve device 5 will be operated by hydraulic pressure in chamber 32 in response to such release of pneumatic pressure from chamber 30 to close communication between the brake cylinder device 2 and the master brake cylinder device 3 and to enlarge chamber 32 to receive hydraulic fluid from pipe 11 and chamber 10 in the brake cylinder device 2, whereupon the spring 16 will move piston 9 and piston rod 15 back toward their normal position and release the brakes on wheel 1.

Having released the brakes on wheel 1 in response to slipping thereof, in the manner just described, said wheel will accelerate back to the ground speed of the airplane whereupon the inertia control device 8 will effect operation of the release valve device 7 and thereby of the piston valve device 5 to displace hydraulic fluid from chamber 32 back into the pressure chamber 10 of the brake cylinder device 2 to reapply the brakes on the landing wheel 1. If the wheel 1 again starts to slip before the airplane comes to a stop, the brakes thereon will again be released and, upon cessation of wheel slip, reapplied in the same manner as above described, until eventually the airplane comes to a stop, it being noted that actual locking and sliding of the wheel is positively prevented during stopping of the plane.

In the operation above described, it will be noted that while bringing the airplane to a stop the pilot need merely retain sufficient pressure on the foot pedal 4 to provide the desired degree of braking of wheel 1 and that locking and sliding of the wheel can not occur after touchdown since the application and release of brakes is taken over and automatically controlled by the wheel slip detecting device 8, the release valve device 7 and the device 5. When the device 5 moves to release position, the pilot may notice a slight drop in resistance to push on the foot pedal 4 as the piston 29 increases the volume of chamber 32 and until the valve 35 closes communication between pipes 11a and 11. He may also notice a slight kick-back of foot pedal 4 by pressure of fluid displaced by piston 29 into pipe 11 when said pipe is reopened to pipe 11a. This vibrating of the foot pedal 4 is very desirable as it will apprise the pilot that the invention is properly operating.

Summary

From the above description it will now be seen that, according to the invention, there has been provided for use with a hydraulic brake apparatus of the type in which, normally, hydraulic fluid from a master brake cylinder device is displaced by manual pressure on a foot pedal to a wheel brake cylinder device to apply a brake to a wheel and is returned to the master brake cylinder device upon release of such manual pressure for releasing said brake, an automatic apparatus responsive to slipping of said wheel on a runway for releasing said brake and operative upon cessation of wheel slip and upon return of said wheel to ground speed to reapply said brake in order to prevent locking and sliding of said wheel on the runway with consequent premature damage to the wheel tire and possible wrecking of an airplane, and without any effect upon the reserve hydraulic fluid in said master brake cylinder device of the system and upon the operator's foot pedal except for the feel of a pressure change impulse indicating that the automatic apparatus is functioning as intended.

Having now described our invention, what we claim as new and desire to secure by Letters Patent, is:

1. A brake control apparatus for a vehicle wheel comprising, in combination, a brake cylinder device operative by hydraulic fluid for braking said wheel and upon release of hydraulic fluid for releasing said wheel, conduit means providing for flow of said hydraulic fluid to and from said brake cylinder device, valve means controlling communication through said conduit means having a first position opening said communication and a second position closing said communication, a piston connected to said valve means having a chamber at one side open to said brake cylinder device, and automatic means controlled by rotation of said wheel operative in response to a slipping condition of said wheel to render said piston movable by hydraulic pressure in said chamber to move said valve means to said second position and upon termination of said slipping condition to effect movement of said piston to displace hydraulic fluid from said chamber to said brake cylinder device and to move said valve means to said first position.

2. A hydraulic brake control apparatus for a wheel comprising, in combination, a brake cylinder device operable by hydraulic fluid pressure to brake said wheel and upon relief of such pressure to release said wheel, means providing a communication for supply and relief of hydraulic fluid pressure to and from said brake cylinder device including a valve for controlling said communication through said means, a piston connected to said valve having at one side a hydraulic chamber connected to said brake cylinder device and at the opposite side a pneumatic pressure chamber and being operative in response to pneumatic pressure in the latter chamber to move said valve to a position for opening said communication and operative by hydraulic pressure in said hydraulic chamber upon relief of said pneumatic pressure to move said valve to another position for closing said communication, a source of pneumatic fluid pressure, a second means including a mechanically operable valve having a normal position for opening communication from said source of pneumatic pressure to said second means and a release position for closing said communication and relieving said pneumatic chamber of said pneumatic pressure, and means adapted to be associated with said vehicle wheel and responsive to a slipping condition of said wheel to operate said mechanically operable valve to its release position and upon cessation of said slipping condition to said normal position.

3. A brake control apparatus comprising, in combination, a source of hydraulic fluid, means for pressurizing said fluid, a first conduit, a hydraulic pressure operable cylinder device connected by said first conduit to said source of hydraulic fluid and adapted for braking a vehicle wheel in response to hydraulic pressure and for releasing said wheel upon relief of such pressure, a first valve means for controlling communication through said first conduit having one position in which said communication is open and a second position in which said communication is closed, a source of pneumatic fluid under pressure, a second conduit, a piston connected to said first valve means having at one side a hydraulic chamber open to said cylinder device and at the opposite side a pneumatic chamber connected by said second conduit to said source of pneumatic fluid under pressure, said piston being operative in response to hydraulic pressure in said hydraulic chamber upon relief of pneumatic fluid pressure in said pneumatic chamber to operate said first valve means to said second position and to expand the volume of said hydraulic chamber to receive hydraulic fluid from said cylinder device and operative in response to pneumatic fluid pressure in said pneumatic chamber to operate said first valve means to said one position and to displace the hydraulic fluid in said hydraulic chamber into said cylinder device, a second valve means for controlling communication through said second conduit having a normal position in which said communication through said second conduit is open and a release position in which said communication through said second conduit is closed and said pneumatic chamber is relieved of pneumatic fluid pressure, and means adapted to be associated with said vehicle wheel and responsive to a slipping condition of said wheel to operate said second valve means to its release position and upon termination of said slipping condition to effect movement of said second valve means to its normal position.

4. In a brake control apparatus of the type having brake applying means responsive to hydraulic pressure for effecting a brake application to a vehicle wheel and to relief of such pressure for releasing said brake application and conduit means providing for flow of hydraulic fluid to said brake applying means, the combination of valve means having a first position opening communication through said conduit means and a second position closing said communication, a piston movable in response to a certain pneumatic fluid pressure in a chamber on one side thereof for operating said valve means to its said first position and movable in response to reduction of said pneumatic fluid pressure in said chamber below said certain pressure under the force of hydraulic pressure in a chamber at the opposite side thereof open to said brake applying means for operating said valve means to its said second position, such latter movement of the piston causing expansion of the last said chamber to receive hydraulic fluid from said brake applying means to release the brake application, and control means for controlling establishment of said certain pneumatic fluid pressure in the first said chamber and the reduction of such pressure below said certain pressure, whereby to control operation of said valve means by said piston.

References Cited in the file of this patent

UNITED STATES PATENTS

| | | |
|---|---|---|
| 2,440,124 | Steins | Apr. 20, 1948 |
| 2,573,387 | Bush | Oct. 30, 1951 |

FOREIGN PATENTS

| | | |
|---|---|---|
| 382,241 | Great Britain | Oct. 20, 1932 |